United States Patent
Martin et al.

(10) Patent No.: US 11,687,443 B2
(45) Date of Patent: Jun. 27, 2023

(54) TIERED PERSISTENT MEMORY ALLOCATION

(71) Applicant: EMC IP Holding Company LLC, Hopkinton, MA (US)

(72) Inventors: Owen Martin, Hopedale, MA (US); Michael Scharland, Franklin, MA (US); Earl Medeiros, Fall River, MA (US); Parmeshwr Prasad, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 39 days.

(21) Appl. No.: 17/159,327

(22) Filed: Jan. 27, 2021

(65) Prior Publication Data

US 2022/0237112 A1 Jul. 28, 2022

Related U.S. Application Data

(63) Continuation of application No. 15/765,215, filed on May 15, 2013, which is a continuation of application No. 15/765,157, filed on May 17, 2021.

(51) Int. Cl.
*G06F 12/02* (2006.01)
*G06F 3/06* (2006.01)
*G06F 12/0873* (2016.01)
*G06F 12/1045* (2016.01)

(52) U.S. Cl.
CPC ........ *G06F 12/0238* (2013.01); *G06F 3/0611* (2013.01); *G06F 3/0659* (2013.01); *G06F 3/0689* (2013.01); *G06F 12/0873* (2013.01); *G06F 12/1054* (2013.01); *G06F 12/1063* (2013.01); *G06F 2212/7201* (2013.01)

(58) Field of Classification Search
None
See application file for complete search history.

(56) References Cited

U.S. PATENT DOCUMENTS

| | | | |
|---|---|---|---|
| 10,360,155 B1* | 7/2019 | Thomas | G06F 3/0649 |
| 2020/0218464 A1* | 7/2020 | Patil | G06F 3/0659 |
| 2021/0011755 A1* | 1/2021 | Shah | G06N 3/06 |
| 2021/0096745 A1* | 4/2021 | Ro | G06F 3/0659 |
| 2021/0240618 A1* | 8/2021 | Gupta | G06F 3/0655 |
| 2022/0057954 A1* | 2/2022 | Cui | G06F 3/0685 |
| 2022/0083273 A1* | 3/2022 | Saito | G06F 3/0604 |

\* cited by examiner

*Primary Examiner* — Stephanie Wu
(74) *Attorney, Agent, or Firm* — Krishnendu Gupta; Nikhil Patel

(57) ABSTRACT

The present disclosure relates to one or more memory management techniques. In embodiments, one or more regions of storage class memory (SCM) of a storage array is provisioned as expanded global memory. The one or more regions can correspond to SCM persistent cache memory regions. The storage array's global memory and expanded global memory can be used to execute one or more storage-related services connected to servicing (e.g., executing) an input/output (IO) operation.

16 Claims, 7 Drawing Sheets

TIERED PERSISTENT MEMORY ALLOCATION

BACKGROUND

Storage systems can include storage class memory (SCM). SCM is a type of nonvolatile storage like NAND flash that provides a power source to ensure that storage systems do not lose data due to a system crash or power failure. SCM treats nonvolatile memory as a dynamic random-access memory (DRAM) and includes it in the storage system's memory space. Access to data in that space is significantly quicker than access to data in local, PCI-connected solid-state drives (SSDs), direct-attached hard drive disks (HDDs), or external storage arrays. SCM read/write technology is up to 10 times faster than NAND flash drives and is more durable.

SUMMARY

The present disclosure relates to one or more memory management techniques. In embodiments, one or more regions of storage class memory (SCM) of a storage array functions as expanded global memory. The one or more regions can correspond to SCM persistent cache memory regions. The storage array's global memory and expanded global memory can be used to execute one or more storage-related services connected to servicing (e.g., executing) an input/output (IO) operation.

In embodiments, the global cache memory and the expanded global memory can function as the storage array's global memory. Further, the global cache memory can correspond to the storage array's local memory, and the expanded global memory can correspond to at least one storage device's persistent page cache memory.

In embodiments, at least one of the global cache memory or the expanded global memory can be assigned to service each IO operation received by the storage array.

In embodiments, one or more patterns related to one or more sets of IOs received by the storage array can be identified.

In embodiments, one or more IO workload models can be generated based on the identified patterns, assigning the global cache memory or the expanded global memory to service each IO operation based on the one or more IO workload models.

In embodiments, a virtual memory searchable data structure can be generated and configured to present virtual memory addresses to one or more host devices. Further, each virtual memory address can be mapped to a physical memory address of the global cache memory or the expanded global memory. Additionally, the virtual memory searchable data structure can be configured with direct access to the physical global cache memory or the physical expanded global memory.

In embodiments, at least one translation lookaside buffer (TLB) can be configured to map at least a portion of the virtual memory addresses to corresponding physical global cache memory addresses. Further, the virtual memory searchable data structure can be updated with a status of each corresponding physical global cache memory address.

In embodiments, the at least one TLB can correspond to the storage array's CPU complex.

In embodiments, an SCM searchable data structure can be established and configured to map at least a portion of the virtual memory address to corresponding physical expanded global memory addresses. Additionally, the virtual memory searchable data structure can update with the status of each related physical expanded global memory address.

In embodiments, IO operations can be managed using each physical global cache memory address's statuses and each physical expanded global memory address.

BRIEF DESCRIPTION OF THE DRAWINGS

The preceding and other objects, features, and advantages will be apparent from the following more particular description of the embodiments, as illustrated in the accompanying drawings. Like reference characters refer to the same parts throughout the different views. The drawings are not necessarily to scale, emphasis instead being placed upon illustrating the embodiments' principles.

DETAILED DESCRIPTION

Storage arrays can include one or more disks such as hard disk drives (HDDs) and/or solid-state drives (SSDs) to provide high capacity, long-term data storage. The arrays can also include dynamic random-access memory (DRAM) that allows access to data much faster than an HDD or SSD. The array can use DRAM to store data and program code for one or more of the array's central processing units (CPUs) because it is much faster than HDD and SSD storage. However, DRAM is much more expensive per Gigabyte (GB) per storage than HDD or SSD storage. Thus, arrays generally only equip minimal amounts of DRAM sufficient to store data and/or program code a CPU uses or is about to need in the new future. Additionally, DRAM is typically located very close to a CPU, either on a CPU chip itself or on a motherboard in the CPU's immediate vicinity and connected by a dedicated data bus to allow instructions and data read/written from/to the CPU quickly. Thus, physical space constraints can prevent an array from including vast amounts of DRAM.

Further, DRAM, also referred to as cache memory, is a volatile memory that requires a continuous power source to store data. A power outage that disrupts power to a storage array can cause the DRAM to lose its stored data. In some cases, the data may be unrecoverable. If the data includes critical information, a business may suffer financially or in some other manner.

To increase memory, e.g., an array's global memory (e.g., the global memory 27 of FIG. 1) and prevent critical data losses, embodiments extend a storage array's global memory with persistent memory. The persistent memory can include storage class memory (SCM). For example, the storage array can include a flash based SSD (e.g., a NAND).

In embodiments, the array can establish a tiered memory architecture that provisions one or more portions of a NAND's persistent memory region (PMR) (e.g., persistent cache memory) as extended global memory.

Accordingly, the tiered memory architecture can include the global memory (e.g., the array's local cache memory such as DRAM) and the extended global memory (e.g., SCM such as the persistent cache memory). The array can implement one or more memory management techniques that stored data in the global memory, extended global memory, or disk-based on skews in memory access patterns and service level agreements (SLAs). For example, the techniques can place active data in the local cache memory or the SCM and idle data in flash memory (e.g., an SSD).

Figure 1:
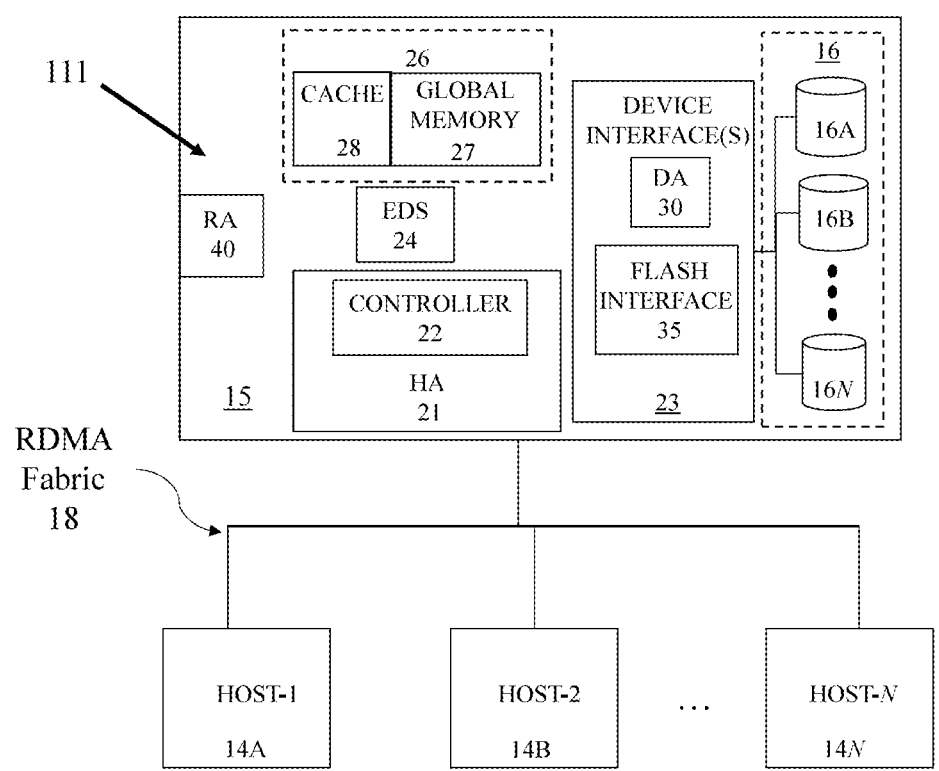
FIG. 1 is a block diagram of a storage system in accordance with example embodiments disclosed herein.

Regarding FIG. 1, an example system 100 includes a data storage array 15 having one or more components 111 that perform one or more storage operations. The array 15 can communicatively couple to host systems 14a-n through communication medium 18. In embodiments, the hosts 14a-n can access the data storage array 15, for example, to perform input/output (IO) operations or data requests. The communication medium 18 can be any one or more of a variety of networks or other types of communication connections known to those skilled in the art. In embodiments, the communication medium 18 can be a network connection, bus, and/or other types of data link, such as a hardwire or other connections known in the art. For example, the communication medium 18 can be the Internet, an intranet, network (including a Storage Area Network (SAN)), or other wireless or other hardwired connection(s) by which the hosts 14a-n can access and communicate with the data storage array 15. The hosts 14a-n can also communicate with other components included in the system 100 via the communication medium 18. The communication medium 18 can be a Remote Direct Memory Access (RDMA) fabric that interconnects hosts 14a-n and the array 15 to form a SAN. The RDMA fabric can use a nonvolatile memory express (NVMe) communications protocol to send/receive data to/from the SAN devices.

The hosts 14a-n and the data storage array 15 can be connected to the communication medium 18 by any one of a variety of connections as can be provided and supported per the type of communication medium 18. The hosts 14a-n can include any one of a variety of proprietary or commercially available single or multi-processor systems, such as an Intel-based processor and other similar processors.

The hosts 14a-n and the data storage array 15 can be located at the same physical size or in different physical locations. The communication medium 18 can use various communication protocols such as SCSI, Fibre Channel, iSCSI, NVMe, and the like. Some or all the connections by which the hosts 14a-n and the data storage array 15 can connect to the communication medium can pass through other communication devices, such as switching equipment that can exist such as a phone line, a repeater, a multiplexer, or even a satellite.

Each of the hosts 14a-n can perform different types of data operations in accordance with different types of tasks. In embodiments, any one of the hosts 14a-n can issue a data request (e.g., an input/out (IO) operation) to the data storage array 15. For example, an application executing on one of the hosts 14a-n can perform a read or write operation resulting in one or more data requests to the data storage array 15.

The storage array 15 can also include adapters or directors, such as an HA 21 (host adapter), RA 40 (remote adapter), and/or device interface 23. Each of the adapters, HA 21, RA 40, can be implemented using hardware, including a processor with local memory. The local memory 26 can store code that the processor can execute to perform one or more storage array operations. The HA 21 can manage communications and data operations between one or more of the host systems 14a-n. The local memory 26 can include global memory (GM) 27.

In an embodiment, the HA 21 can be a Fibre Channel Adapter (FA) or another adapter which facilitates host communication. The HA 21 can receive IO operations from the hosts 14a-n. The storage array 15 can also include one or more RAs (e.g., RA 40) that can, for example, facilitate communications between data storage arrays (e.g., between the storage array 12 and the external storage system(s)). The storage array 15 can also include one or more device interfaces 23 for facilitating data transfers to/from the data storage disks 16. The data storage interfaces 23 can include device interface modules, for example, one or more disk adapters (DAs) 30 (e.g., disk controllers), flash drive interface 35, and the like. The DA 30 can interface with the physical data storage disks 16.

In embodiments, the storage array 15 can include one or more internal logical communication paths (e.g., paths 221, 222 of FIG. 2) between the device interfaces 23, the RAs 40, the HAs 21, and the memory 26. The communication paths can include internal busses and/or communication modules. For example, the GM 27 can use the communication paths to transfer data and/or send other communications between the device interfaces 23, HAs 21 and/or RAs 40 in a data storage array. In an embodiment, the device interfaces 23 can perform data operations using a cache that can be included in the GM 27, for example, when communicating with other device interfaces and other components of the data storage array. The local memory 26 can also include additional cache memory 28 can be a user-defined adaptable memory resource.

The host systems 14a-n can issue data and access control information through the SAN 18 to the storage array 15. The storage array 15 can also provide data to the host systems 14a-n via the SAN 18. Rather than presenting address spaces of the disks 16a-n, the storage array 15 can provide the host systems 14a-n with logical representations that can include logical devices or logical volumes (LVs) that represent one or more physical storage addresses of the disk 16. Accordingly, the LVs can correspond to one or more of the disks 16a-n. Further, the array 15 can include an Enginuity Data Services (EDS) processor 24. The EDS 24 can control the storage array components 111. In response to the array receiving one or more real-time IO operations, the EDS 24 applies self-optimizing techniques (e.g., one or more machine learning techniques) to deliver performance, availability and data integrity services.

The storage disk 16 can include one or more data storage types. In embodiments, the data storage types can include one or more hard disk drives (HDDs) and/or one or more solid state drives (SSDs). An SSD is a data storage device that uses solid-state memory to store persistent data. An SSD that includes SRAM or DRAM, rather than flash memory, can also be referred to as a RAM drive. SSD can refer to solid-state electronics devices distinguished from electro-mechanical devices, such as HDDs, having moving parts.

The array 15 can enable multiple hosts to share data stored on one or more of the disks 16a-n. Accordingly, the HA 21 can facilitate communications between a storage array 15 and one or more of the host systems 14a-n. The RA 40 can be configured to facilitate communications between two or more data storage arrays. The DA 30 can be one type of device interface used to enable data transfers to/from the associated disk drive(s) 16a-n and LV(s) residing thereon. A flash device interface 35 can be configured as a device interface for facilitating data transfers to/from flash devices and LV(s) residing thereon. It should be noted that an embodiment can use the same or a different device interface for one or more different types of devices than as described herein.

The device interface, such as a DA 30, performs IO operations on a disk 16a-n. For example, the DA 30 can receive LV information contained in a data request issued by at least one of the hosts 14a-n. The DA 30 can create one or more job records for an address space of a disk corresponding to the received LV. Job records can be associated with their respective LVs in a searchable data structure stored and managed by the DA 30. One or more of the disks 16a-n can include persistent storage class memory (SCM) such as persistent cache memory. In embodiments, the HA 21 can include a controller 22 configured to perform one or more memory management techniques as described in greater detail herein. The entire controller 22, or portions of the controller 22, may also reside elsewhere, such as, for example, in EDS 24 or any of the array's other components 111. Additionally, the controller 22 can be a parallel processor such as a graphical processing unit (GPU).

Figure 2:
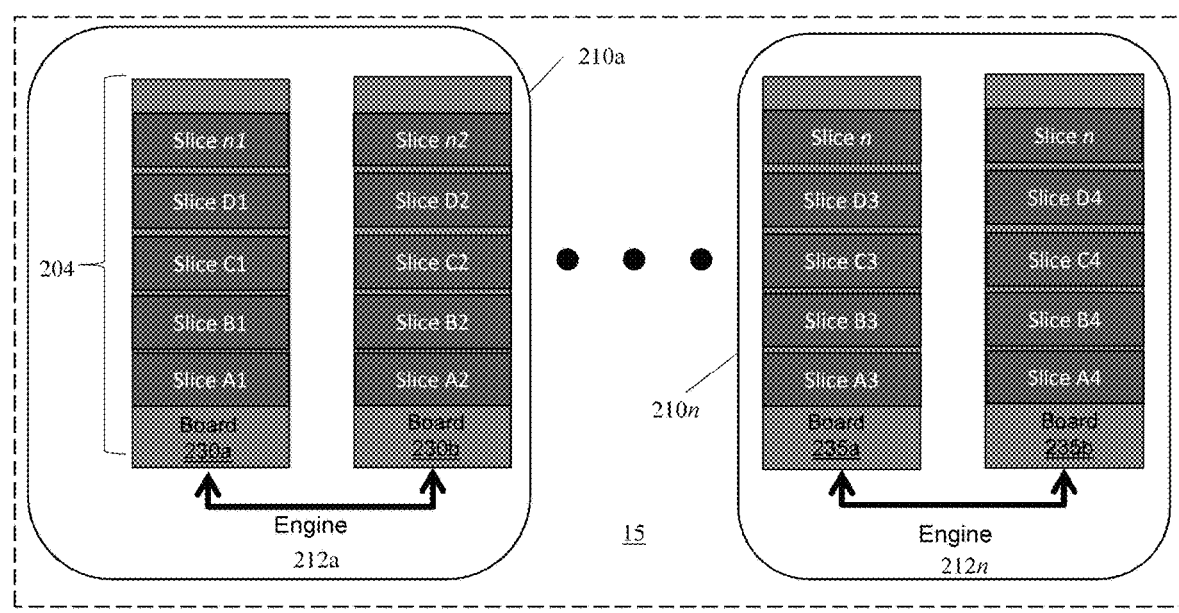
FIG. 2 is a block diagram of storage device engines in accordance with example embodiments disclosed herein.

Regarding FIG. 2, the storage array 15 includes engines 212a-n configured to provide storage services. Each of the engines 212a-n include hardware circuitry and/or software components required to perform the storage device services. The array 15 can house each engine 212a-n in a shelf (e.g., housing) 210a-n that interfaces with the array's cabinet and/or rack (not shown).

Figure 2A:
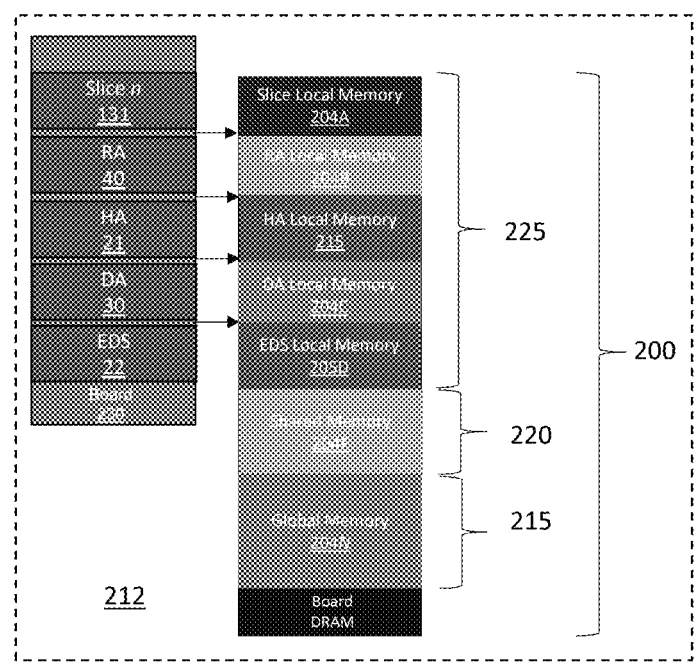
FIG. 2A is a block diagram of a storage array board in accordance with example embodiments disclosed herein.

In embodiments, each engine 212a-n can include one or more boards 230. In the non-limiting example illustrated by FIG. 2, each engine 212a-n includes a pair of boards 230a-b, 235a-b. Each board 230a-b, 235a-b includes slice elements 205 comprising hardware and/or software elements of the boards 230a-b, 235a-b. The slice elements can include slices A1-n1, A2-n2, A3-n3, and A4-n4. Each slice A1-n1, A2-n2, A3-n3, and A4-n4 can correspond to one or more of the components 111 described illustrated by FIG. 1. Regarding FIG. 2A, the slice elements 205 can, e.g., correspond to one the EDS 22, DA 30, HA 21, and/or RA 30. In embodiments, a board 230 can include one or more additional slices 131 that correspond to other known storage device components.

In further embodiments, a board 230 can include memory 200 (e.g., dynamic random-access memory (DRAM)). The controller 22 of FIG. 1 can subdivide the memory 200 into one or more portions 215-225. For example, the controller 22 can provision the portion 215 as a global memory portion 204N of the global memory 27. As such, the global memory portion 204N of each board 230 can form the storage array's total global memory 27. In additional embodiments, the controller 22 can allocation a second portion 220 as shared memory 204F. The controller 22 can enable access to the shared memory 204F by each of the slice elements 205. In further embodiments, the controller 22 can establish the remaining DRAM portions 225 as local memory 204A-D for exclusive use by each of the slice elements 205. For example, the controller 22 can configure the local memory 204A-D for the exclusive use of the EDS 24, the HA 21, DA 30, and RA 40.

Figure 3:
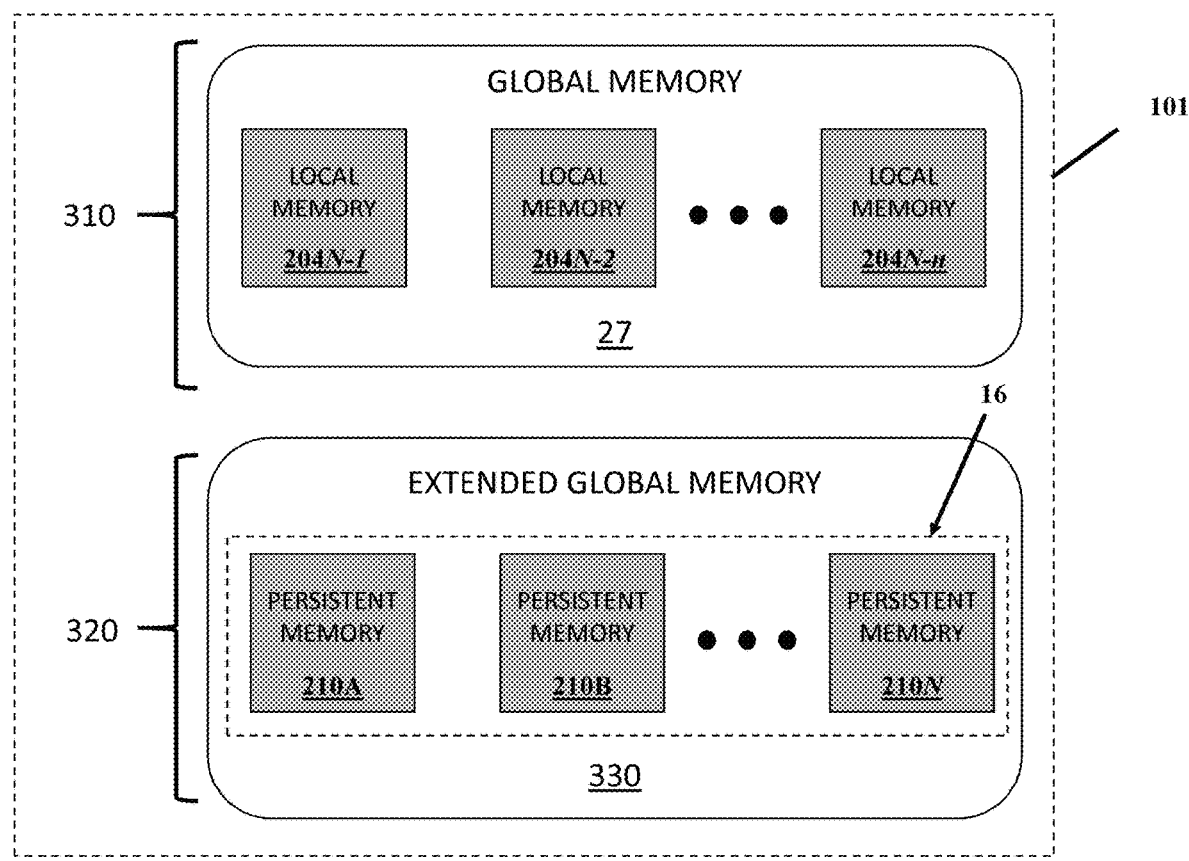
FIG. 3 is a block diagram of a tiered memory architecture in accordance with example embodiments disclosed herein.

Regarding FIG. 3, the controller 22 of FIG. 1 can establish a tiered cache memory architecture 101. As discussed in greater detail herein, the controller 22 can present the tiered cache memory architecture 101 as virtual remote direct memory access (RDMA) memory regions to hosts 14a-n.

For example, the controller 22 can establish the global memory 27 and an extended global memory 330 as a first-tier 310 (tier-1) and second-tier 320 (tier-2), respectively, based on their memory characteristics (e.g., performance, capacity, volatility). In embodiments, the controller 22 can establish the array's DRAM portions 215 as global memory 27 (e.g., tier-1 memory). The portions 215 can be selected as tier-1 memory because the array's board DRAM can achieve memory performances that exceed many, if not all, of the array's alternative memory options. Specifically, the board DRAM portions 215 can be coupled to a dual in-line memory module (DIMM) that connects directly to the array's CPU complex (not shown) that enables such performances. However, the DRAM portions 217 can be volatile memory that require continuous power to store data. As such, a business may wish to expand its array's global memory with a persistent cache memory that does not require a continuous power source to store data. Additionally, the cost and/or the array's form factor can make it very expensive and/or challenging to increase the array's DRAM capacity.

In embodiments, The MMP 445 can statically establish the tiered memory architecture 101 (e.g., during initialization of the array 15). Additionally, the MMP 445 can dynamically establish the tiered memory architecture 101 (e.g., in real-time) based on historical, current, and/or anticipated IO memory access request patterns.

Thus, the controller 22 can be configured to dynamically or statically expand the global memory 27 by establishing a second global memory tier 320 (e.g., extended global memory 330). For example, the array's disks 16 can include one or more SSDs with storage-class memory (SCM). The SCM can correspond to cache in the disk's persistent memory region (e.g., PMR). Although the SCM can be slower, it can have many other similar performance characteristics as the array's DRAM portions 215 and does not require continuous power to store data. Thus, the controller 22 can provision one or more of each disk's persistent cache memory portions 210A-N as extended global memory 330.

Figure 4:
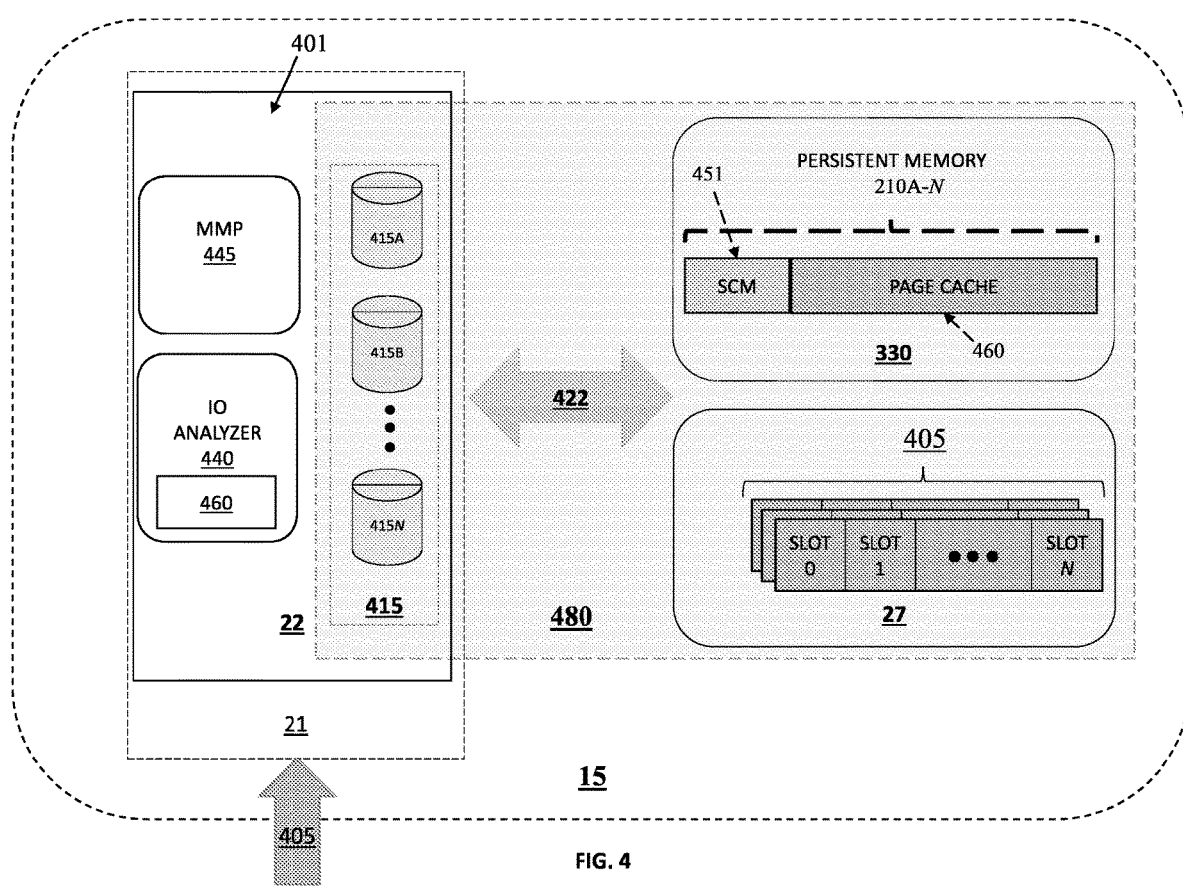
FIG. 4 is a block diagram of a host adapter and one or more storage array components in accordance with example embodiments disclosed herein.

Regarding FIG. 4, the HA 21 can include a controller 22. The controller 22 can include one or more elements 201 (e.g., software and/or hardware elements) that perform one or more memory management techniques. In embodiments, the controller can include an IO analyzer 440 that analyzes 10 workloads 405 received by the storage array 25. Additionally, the controller 22 can include a memory management processor (MMP) 445 that can manage memory access requests associated with each workload's IO operations.

In embodiments, the MMP 445 can establish a virtual memory architecture (VMA) 480 that defines at least one thin device (TDEV). Each TDEV 415 can correspond to at least one logical unit number (LUN) (e.g., a logical volume (LV)). A LUN can correspond to a slice or portion of the disks 16. The MMA 445 can provision each TDEV 415 with one or more logical data devices (i.e., TDATs 415A-N). The TDATs 415A-N provide each TDEV with physical address memory spaces 405, 451, 460. The physical address memory spaces can correspond to the array's global memory address spaces 405, SCM address spaces 451, and page cache memory address spaces 460. Accordingly, the HA 21 can provide the hosts 14a-n with virtual storage and memory representations using each TDEV 415. Further, the VMA 480 can include the array's tiered memory tiered memory regions (e.g., tiered memory) 101.

In embodiments, the MMP 445 can provision the tiered memory architecture 101 with a first-tier (e.g., tier 320 of FIG. 3) and a second-tier (e.g., tier 330 of FIG. 3). The first tier can correspond to the array's global memory 27. The second tier is an extended global memory that includes persistent cache memory 210A-N. In embodiments, the MMP 445 can establish persistent cache memory 210A-N. The persistent cache memory 210A-N can include storage class memory (SCM) 451 and page cache memory 461.

In embodiments, the MMA 445 can establish the tiered memory architecture 101 using persistent cache memory 210A-N accessible via a Remote Direct Memory Access (RDMA) fabric 422. The RDMA fabric 422 can enable memory access without requiring the array's CPU complex resources (e.g., a CPU, the MMA 445 to reduce IO response times. Thus, the MMA 445 can establish an IO path that includes the fabric to reduce the array's IO response times.

In embodiments, the analyzer 440 can monitor each workload's IO virtual memory access request and corresponding physical memory address spaces. Additionally, the analyzer 440 can analyze one or more parameters included in each IO's request and metadata. The one or more parameters can correspond to one or more of a service level (SL), IO types, IO sizes, track sizes, activity types, memory access types, and patterns of each parameter (e.g., frequency), and the like. An SL can define a performance parameter for read/write data involved with an IO operation. The performance parameter can correspond to the array's IO response time.

In further embodiments, the analyzer 440 can include a machine learning (ML) engine 460 that generates one or more predictive models. For example, the ML engine 460 can generate predictions of time windows it anticipates the storage array 15 to receive each of the IO workloads 405. Additionally, the ML engine 460 can categorize each IO workload 405 based on each workload's IO characteristics. The characteristics can correspond to IO operation parameters as defined in the preceding paragraph. Based on the characteristics, the ML engine 460 can identify patterns in each workload's IO operations. For example, the patterns can define frequencies of memory access hits and misses.

Further, the patterns can associate each hit with a corresponding physical memory address space, and each miss with a correspond physical disk address space. The ML engine 460 can further determine cache memory hits and/or misses. Based on the patterns of memory hits/misses, the ML engine 460 can generate one or more memory access models.

In embodiments, the memory access models can define tiered memory level IO memory access forecasts. The memory access forecasts can determine read/write memory access densities (e.g., access requests per unit of time) corresponding to each physical memory address space. Using the memory access models, the MMA 445 can dynamically adjust the tiered memory architecture's allocations of global memory 27 and extended global memory 330.

In embodiments, each memory access model can define a memory access threshold. The memory access threshold can correspond to a percentage of hits and/or misses. Thus, the MMA 445 can dynamically adjust the tied memory architecture's allocations of global memory 27 and extended global memory 330 in response to a workload 405 meeting a memory access threshold. Accordingly, each memory access model allows the MMA 445 can track IO tier memory access levels to identify changes in forecasted memory access patterns. In response to determining a change, the MMA 445 can adjust, in real-time, allocations of the global cache memory 405 and persistent cache memory 210A-N.

Figure 5:
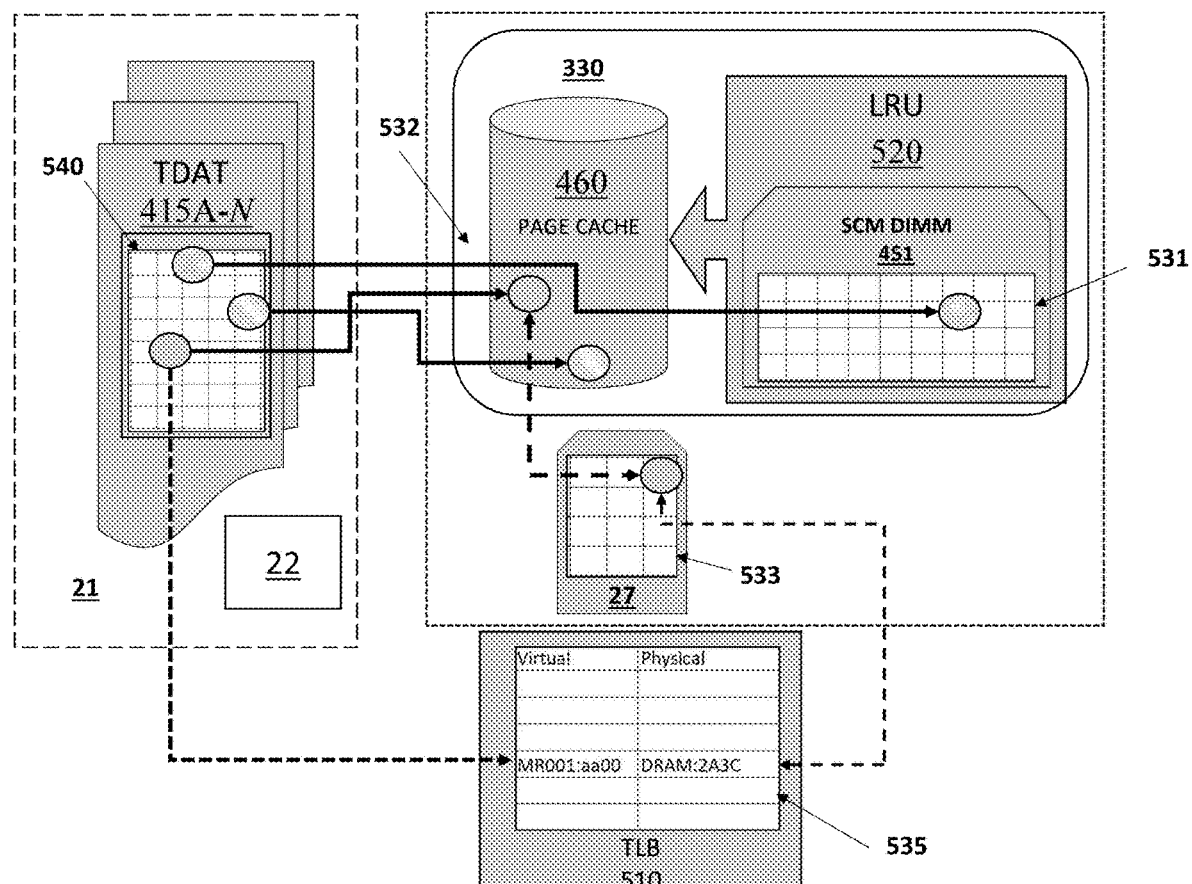
FIG. 5 is a block diagram of memory mapping of a storage array in accordance with example embodiments disclosed herein.

Regarding FIG. 5, the MMU 445 can manage the tiered memory architecture 101 by placing active data in global memory 27 and/or extended global memory 330. For example, the MMU 445 can identify skews in memory access patterns using one or more of the memory access models. Using the identified skews, the MMU 445 can identify both active data and idle data. In response to identifying the active and idle data, the MMU 445 can allocate memory from the global memory 27 and/or the extended global memory 300 for the active data and disk storage 16 for the idle data.

In embodiments, the MMU 445 can generate a virtual memory mapping table (VMMT) 540 stored by at least one TDAT 415A-N. The VMMT 540 can associate each virtual memory and storage representation visible to the hosts 14a-n with their respective physical memory and storage address space (e.g., track identifier (TID)). For example, the VMMT 540 can associate virtual memory with global memory address spaces 530, SCM address spaces 531, and page cache address spaces 532. Using the VMMT 540, the MMU 445 can load a translation lookaside buffer (TLB) 510 with the VMMT 540 to enable IO operations to have direct memory access as described herein. Specifically, the TLB 510 is an address-translation memory cache that stores translations of virtual memory to physical memory. The TLB 510 can reside between the array's CPU complex and the tiered memory architecture 101 (e.g., in the IO path 422 of FIG. 4).

In embodiments, the MMU 445 can provision persistent memory 210A-N for the extended global memory 330 by allocating SCM 451 from one or more persistent memory regions of the disks 16. Further, the MMU 445 can establish at least one page cache 460. Thus, the persistent memory 210A-N can include the SCM 451 and page cache 460.

In embodiments, the TLB 510 can have a limited capacity and, thus can only store a limited amount of translations. Because the page cache 460 can have slower response times, the MMU 445 may only load the TLB 510 with translations corresponding to the global memory 27 and/or the SCM 451.

In embodiments, the MMU 445 can determine that data associated with one or more of the global memory and/or SCM address spaces 530, 531 has become idle. In embodiments, the MMU 445 can perform the determination in response to identifying a capacity of the SCM 451 and/or global memory 27 reaching a threshold capacity. In examples, the MMU 445 can identify idle data stored by the SCM using a least recently used (LRU) thread 520. The LRU thread 520 can determine which of the SCM address spaces 531 are associated with a least amount of memory access requests over a time interval.

In response identifying idle data, the MMU 445 can purge the idle data from the corresponding address spaces and store the data in the page cache 460 or disk 16. In response to a purge, the MMU 445 can update the VMMT 540 with updated information that identifies the purge address spaces as being free and associate the newly allocated address spaces allocated to store the idle data with their respective virtual representations.

In embodiments, the MMU 445 can identify data that has become active. As such, the MMU 445 can identify one or more free global memory and/or SCM address spaces 530, 531. The MMU 445 can further select one of the available address spaces: 530 and 531 to store the active data. Additionally, the MMU 445 can update the VMMT 540 and load the TLB 510 with revised translations.

Figure 6:
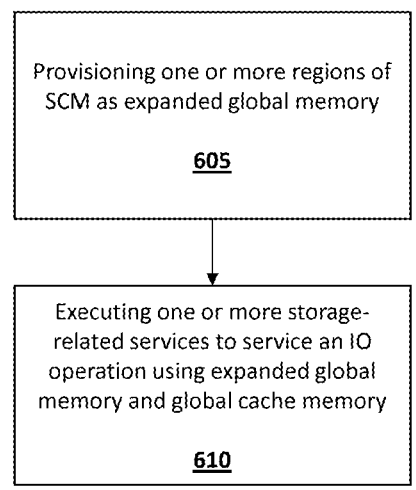
FIG. 6 is a flow diagram of a method for provisioning SCM memory in accordance with embodiments disclosed herein.

FIG. 6 illustrates a method per one or more embodiments of this disclosure. For simplicity of explanation, FIG. 6 depicts and describes the method as a series of acts. However, acts per this disclosure can occur in various orders and/or concurrently, and with other acts not presented and described herein. Furthermore, not all illustrated acts may be required to implement the method in accordance with the disclosed subject matter.

Regarding FIG. 6, a method 600 can be executed by, e.g., an HA 21. The method 600, at 605, can include provisioning one or more regions of storage class memory (SCM) of a storage array as expanded global memory. The one or more regions can correspond to SCM persistent cache memory regions. Further, at 610, the method 600 can include executing one or more storage-related services to service an input/output (IO) operation using one or more of the expanded global memory and global cache memory. The method 600 can be performed according to any of the embodiments and/or techniques described by this disclosure, known to those skilled in the art, and/or yet to be known to those skilled in the art.

Using the teachings disclosed herein, a skilled artisan can implement the above-described systems and methods in digital electronic circuitry, computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be in any programming language, including compiled and/or interpreted languages. The computer program can have any deployed form, including a stand-alone program or as a subroutine, element, and/or other units suitable for a computing environment. One or more computers can execute a deployed computer program.

One or more programmable processors can perform the method steps by executing a computer program to perform functions of the concepts described herein by operating on input data and generating output. An apparatus can also perform the method steps. The apparatus can be a special purpose logic circuitry. For example, the circuitry is an FPGA (field-programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors and any one or more processors of any digital computer. Generally, a processor receives instructions and data from a read-only memory or a random-access memory, or both. For example, a computer's essential elements are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

A computer having a display device that enables user interaction can implement the above-described techniques. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can provide for interaction with a user. Other devices can, for example, be feedback provided to the user in any form of sensory feedback (e.g., visual feedback, auditory feedback, or tactile feedback). Input from the user can, for example, be in any form, including acoustic, speech, and/or tactile input.

A distributed computing system that includes a back-end component can also implement the above-described techniques. The back-end component can, for example, be a data server, a middleware component, and/or an application server. Further, a distributing computing system that includes a front-end component can implement the above-described techniques. The front-end component can, for example, be a client computer having a graphical user interface, a Web browser through which a user can interact with an example implementation, and/or other graphical user interfaces for a transmitting device. The system's components can interconnect using any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. A client and server relationship can arise by computer programs running on the respective computers and having a client-server relationship.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 networks, 802.16 networks, general packet radio service (GPRS) network, HiperLAN), and/or other packet-based networks. Circuit-based networks can include, for example, a public switched telephone network (PSTN), a private branch exchange (PBX), a wireless network, and/or other circuit-based networks. Wireless networks can include RAN, Bluetooth, code-division multiple access (CDMA) network, time division multiple access (TDMA) network, and global system for mobile communications (GSM) network.

The transmitting device can include, for example, a computer, a computer with a browser device, a telephone, an IP phone, a mobile device (e.g., cellular phone, personal digital assistant (P.D.A.) device, laptop computer, electronic mail device), and/or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, and/or plural forms of each are open-ended and include the listed parts and include additional elements that are not listed. And/or is open-ended and includes one or more of the listed parts and combinations of the listed features.

One skilled in the art will realize that other specific forms can embody the concepts described herein without departing from their spirit or essential characteristics. Therefore, the preceding embodiments are in all respects, illustrative rather than limiting the concepts described herein. Scope of the concepts is thus indicated by the appended claims rather than by the preceding description. Therefore, all changes embrace the meaning and range of equivalency of the claims.

What is claimed is:

1. A method comprising:
   provisioning one or more regions of storage class memory (SCM) of a storage array as expanded global memory, the one or more regions corresponding to SCM persistent cache memory regions;
   configuring at least one translation lookaside buffer (TLB) to map at least a portion of virtual memory addresses to corresponding physical global cache memory addresses;
   updating a virtual memory searchable data structure with a status of each corresponding physical global cache memory address;
   generating the virtual memory searchable data structure configured to present the virtual memory addresses to one or more host devices;
   mapping each virtual memory address to a physical memory address of the global cache memory or the expanded global memory;
   configuring the virtual memory searchable data structure with direct access to the physical global cache memory or the physical expanded global memory; and
   executing one or more storage-related services to service an input/output (JO) operation using one or more of the expanded global memory and global cache memory.

2. The method of claim 1, further comprising:
   configuring the global cache memory and the expanded global memory as the storage array's global memory, the global cache memory corresponding to the storage array's local memory, and the expanded global memory corresponding to at least one storage device's persistent page cache memory.

3. The method of claim 1 further comprising assigning at least one of: the global cache memory or the expanded global memory to service each IO operation received by the storage array.

4. The method of claim 3 further comprising identifying one or more patterns related to one or more sets of IOs received by the storage array.

5. The method of claim 4 further comprising:
   generating one or more IO workload models based on the identified patterns; and
   assigning the global cache memory or the expanded global memory to service each IO operation based on the one or more IO workload models.

6. The method of claim 1, wherein the at least one TLB corresponds to the storage array's CPU complex.

7. The method of claim 1 further comprising:
   establishing an SCM searchable data structure configured to map at least a portion of the virtual memory address to corresponding physical expanded global memory addresses; and
   updating the virtual memory searchable data structure with a status of each related physical expanded global memory address.

8. The method of claim 7 further comprising managing JO operations using each physical global cache memory address's statuses, and each physical expanded global memory address.

9. An apparatus comprising a memory and at least one processor configured to:
   provision one or more regions of storage class memory (SCM) of a storage array as expanded global memory, the one or more regions correspond to SCM persistent cache memory regions;
   configure at least one translation lookaside buffer (TLB) to map at least a portion of virtual memory addresses to corresponding physical global cache memory addresses;
   update a virtual memory searchable data structure with a status of each corresponding physical global cache memory address;
   generate the virtual memory searchable data structure configured to present the virtual memory addresses to one or more host devices;
   map each virtual memory address to a physical memory address correspond to the global cache memory or the expanded global memory;
   configure the virtual memory searchable data structure with direct access to the physical global cache memory or the physical expanded global memory; and
   execute one or more storage-related services to service an input/output (JO) operation using one or more of the expanded global memory and global cache memory.

10. The apparatus of claim 9, further configured to:
    configure the global cache memory and the expanded global memory as the storage array's global memory, the global cache memory corresponding to the storage array's local memory, and the expanded global memory correspond to at least one storage device's persistent page cache memory.

11. The apparatus of claim 9 further configured to assign at least one of: the global cache memory or the expanded global memory to service each JO operation received by the storage array.

12. The apparatus of claim 11 further configured to identify one or more patterns related to one or more sets of IOs received by the storage array.

13. The apparatus of claim 12 further configured to:
    generate one or more IO workload models based on the identified patterns; and
    assign the global cache memory or the expanded global memory to service each IO operation based on the one or more IO workload models.

14. The apparatus of claim 9, wherein the at least one TLB corresponds to the storage array's CPU complex.

15. The apparatus of claim 9 further configured to:
    establish an SCM searchable data structure configured to map at least a portion of the virtual memory address to correspond physical expanded global memory addresses; and
    update the virtual memory searchable data structure with a status of each related physical expanded global memory address.

16. The apparatus of claim 15 further configured to manage JO operations us each physical global cache memory address's statuses, and each physical expanded global memory address.

* * * * *